United States Patent
Gühring et al.

(10) Patent No.: US 8,712,133 B2
(45) Date of Patent: Apr. 29, 2014

(54) CARDIAC CHAMBER VOLUME COMPUTATION FROM CONTOURS AND BASE PLANE IN CARDIAC MR CINE IMAGES

(75) Inventors: Jens Gühring, Erlangen (DE);
Marie-Pierre Jolly, Hillsborough, NJ (US); Christoph Guetter, Lawrenceville, NJ (US); Xiaoguang Lu, West Windsor, NJ (US); Carmel Hayes, München (DE); Peter Speier, Erlangen (DE); Davide Piccini, Prilly (CH)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/246,002

(22) Filed: Sep. 27, 2011

(65) Prior Publication Data
US 2013/0259337 A1    Oct. 3, 2013

Related U.S. Application Data

(60) Provisional application No. 61/387,677, filed on Sep. 29, 2010.

(51) Int. Cl.
*G06K 9/00* (2006.01)
(52) U.S. Cl.
USPC ........................................................ 382/131
(58) Field of Classification Search
USPC .................. 382/128–134; 128/920–925; 356/39–49; 600/407–414, 424–426; 345/581–618; 250/455
See application file for complete search history.

(56) References Cited

U.S. PATENT DOCUMENTS

| | | | |
|---|---|---|---|
| 5,435,310 A * | 7/1995 | Sheehan et al. | 600/416 |
| 2002/0072672 A1 * | 6/2002 | Roundhill et al. | 600/450 |
| 2004/0223636 A1 * | 11/2004 | Edic et al. | 382/131 |

OTHER PUBLICATIONS

X. Lu, B. Georgescu, M.-P. Jolly, J. Guehring, A. Young, B. Cowan, A. Littmann, D. Comaniciu, "Cardiac anchoring in MRI through context modeling", MICCAI, 2010.
Z. Tu, "Probabilistic boosting-tree: Learning discriminative models for classification, recognition, and clustering" ICCV 1589-1596 (2005).
Zheng, Y., Barbu, A., Georgescu, B., Scheuering, M., Comaniciu, D.: Fast automatic heart chamber segmentation from 3D CT data using marginal space learning and steerable features. In: Proc. ICCV. (2007).
C. Guetter, H. Xue, C. Chefd'Hotel, J. Guehring, Efficient Symmetric and Inverse-Consistent Deformable Registration Through Interleaved Optimization, ISBI, 2011.

* cited by examiner

*Primary Examiner* — Atiba O Fitzpatrick
(74) *Attorney, Agent, or Firm* — Donald B. Paschburg

(57) ABSTRACT

A system receives cardiac cine MR images consists of multiple slices of the heart over time. A series of short axis images slices are received. Long axis images are also received by the system, wherein a base plane defined by landmark points is detected. An intersection of the base plane with a contour of a heart chamber is determined for a plurality of slices in the short axis image. A volume for each of the contour slices covering the heart chamber, including for contours that are limited by base plane intersections, is evaluated. All slice volumes are summed to determine a total volume of the chamber. In one embodiment the chamber is a left ventricle and the landmark is a mitral valve. An ejection factor is determined.

17 Claims, 8 Drawing Sheets

CARDIAC CHAMBER VOLUME COMPUTATION FROM CONTOURS AND BASE PLANE IN CARDIAC MR CINE IMAGES

STATEMENT OF RELATED CASES

This case claims priority to and the benefit of U.S. Provisional Patent Application Ser. No. 61/387,677, filed Sep. 29, 2010 which is incorporated herein by reference.

TECHNICAL FIELD

The present invention relates to systems and methods for cardiac imaging and more specifically to cardiac chamber volume computation from cardiac MR Cine images.

BACKGROUND

Cardiac cine MR images consists of multiple (usually 8-10) slices of the heart over time (usually 20-30 phases). Physicians are interested in computing the volume of the left ventricle at each phase to determine the ejection fraction and other important diagnostic measures, including the left ventricular ejection fraction and the right ventricular ejection fraction.

The traditional approach to compute the volume is to contour the area of interest, in this case the blood pool (endocardium) or epicardium of the left ventricle on a series of short axis slices. These contours are then stacked and given a thickness based on the slice thickness and the inter-slice spacing to compute individual volume contributions which are then summed to obtain the final volume. The same computation is applied for the right ventricle.

A major problem with this technique is the imprecision at the mitral valve base plane. This plane is oblique compared to the short axis plane and is very difficult to define well on short axis images.

Accordingly, novel and improved methods and systems to perform cardiac chamber volume computation from cardiac MR Cine images are required.

SUMMARY OF THE INVENTION

A system and methods for Cardiac Chamber Volume Computation from Contours and Base Plane in Cardiac MR Cine Images are provided in accordance with one or more aspects of the present invention.

In accordance with an aspect of the present invention a method is provided for calculating a volume of a cardiac chamber from a plurality of slices of image data, comprising a processor receiving a plurality of short axis images and a plurality of long axis images of the chamber, the processor determining a base plane from a landmark in a long axis image of the chamber, the processor determining an intersection between the base plane and the short axis images, the processor determining a contour in a first slice of the chamber in a short axis image determined by a segmentation of the chamber and the intersection, and the processor calculating a volume related to the contour in the first slice.

In accordance with another aspect of the present invention a method is provided, wherein the volume related to the contour in the first slice is a first partial contribution to the volume.

In accordance with yet another aspect of the present invention a method is provided, wherein an area of the first contour is discretized by applying a factor to each pixel inside the first contour depending on its neighboring pixels.

In accordance with yet another aspect of the present invention a method is provided, further comprising, the processor calculating a volume related to a contour in a second slice of the chamber in a short axis image determined by a segmentation of the chamber which does not intersect with the base plane.

In accordance with yet another aspect of the present invention a method is provided, wherein the volume related to the contour in the second slice is a second partial contribution to the volume.

In accordance with yet another aspect of the present invention a method is provided, wherein the volume is calculated by summing all partial contributing volumes related to contours in slices located between a base and an apex of the chamber.

In accordance with yet another aspect of the present invention a method is provided, wherein the chamber is a left ventricle.

In accordance with yet another aspect of the present invention a method is provided, wherein the landmark is a mitral valve anchor point.

In accordance with yet another aspect of the present invention a method is provided, wherein the volume is determined by an expression $$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) + \sum_{i=base+1}^{i=apex-1} I_i\left(\frac{|P_{i+1} - P_i|}{2} + \frac{|P_i - P_{i-1}|}{2}\right) - UP_{bp},$$

wherein $V_{act}$ is the volume of the cardiac chamber, I is an area of a contour in a slice, P is a 3D position of a slice, T is a thickness of a slice, base is an index for a basal slice of the cardiac chamber, apex is an index of an apical slice of the cardiac chamber and $UP_{bp}$ is a cut-off volume that is cut-off from a segmentation of the cardiac chamber by the base plane.

In accordance with yet another aspect of the present invention a method is provided, wherein the volume is applied to evaluate an ejection fraction.

In accordance with a further aspect of the present invention a system is provided to calculate a volume of a cardiac chamber from a plurality of slices of image data, comprising a memory enabled to store instructions and data, a processor enabled to execute instructions to perform the steps: receiving a plurality of short axis images and a plurality of long axis images of the chamber, determining a base plane from a landmark in a long axis image of the chamber, determining an intersection between the base plane and the short axis images, deter wining a contour in a first slice of the chamber in a short axis image determined by a segmentation of the chamber and the intersection and calculating a volume related to the contour in the first slice.

In accordance with yet a further aspect of the present invention a system is provided, wherein the volume related to the contour in the first slice is a first partial contribution to the volume.

In accordance with yet a further aspect of the present invention a system is provided, wherein an area of the first contour is discretized by applying a factor to each pixel inside the first contour depending on its neighboring pixels.

In accordance with yet a further aspect of the present invention a system is provided, further comprising, the processor calculating a volume related to a contour in a second slice of the chamber in a short axis image determined by a segmentation of the chamber which does not intersect with the base plane.

In accordance with yet a further aspect of the present invention a system is provided, wherein the volume related to the contour in the second slice is a second partial contribution to the volume.

In accordance with yet a further aspect of the present invention a system is provided, wherein the volume is calculated by summing all partial contributing volumes related to contours in slices located between a base and an apex of the chamber.

In accordance with yet a further aspect of the present invention a system is provided, wherein the chamber is a left ventricle.

In accordance with yet a further aspect of the present invention a system is provided, wherein the landmark is a mitral valve anchor point.

In accordance with yet a further aspect of the present invention a system is provided, wherein the volume is determined by an expression $$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) + \sum_{i=base+1}^{i=apex-1} I_i\left(\frac{|P_{i+1} - P_i|}{2} + \frac{|P_i - P_{i-1}|}{2}\right) - UP_{bp},$$

wherein $V_{act}$ is the volume of the cardiac chamber, I is an area of the contour in a slice, P is a 3D position of a slice, T is a thickness of a slice, base is an index for a basal slice of the cardiac chamber, apex is an index of an apical slice of the cardiac chamber and $UP_{bp}$ is a cut-off volume that is cut-off from a segmentation of the cardiac chamber by the base plane.

In accordance with yet a further aspect of the present invention a system is provided, wherein the volume is applied to evaluate an ejection fraction.

DESCRIPTION

Figure 1:
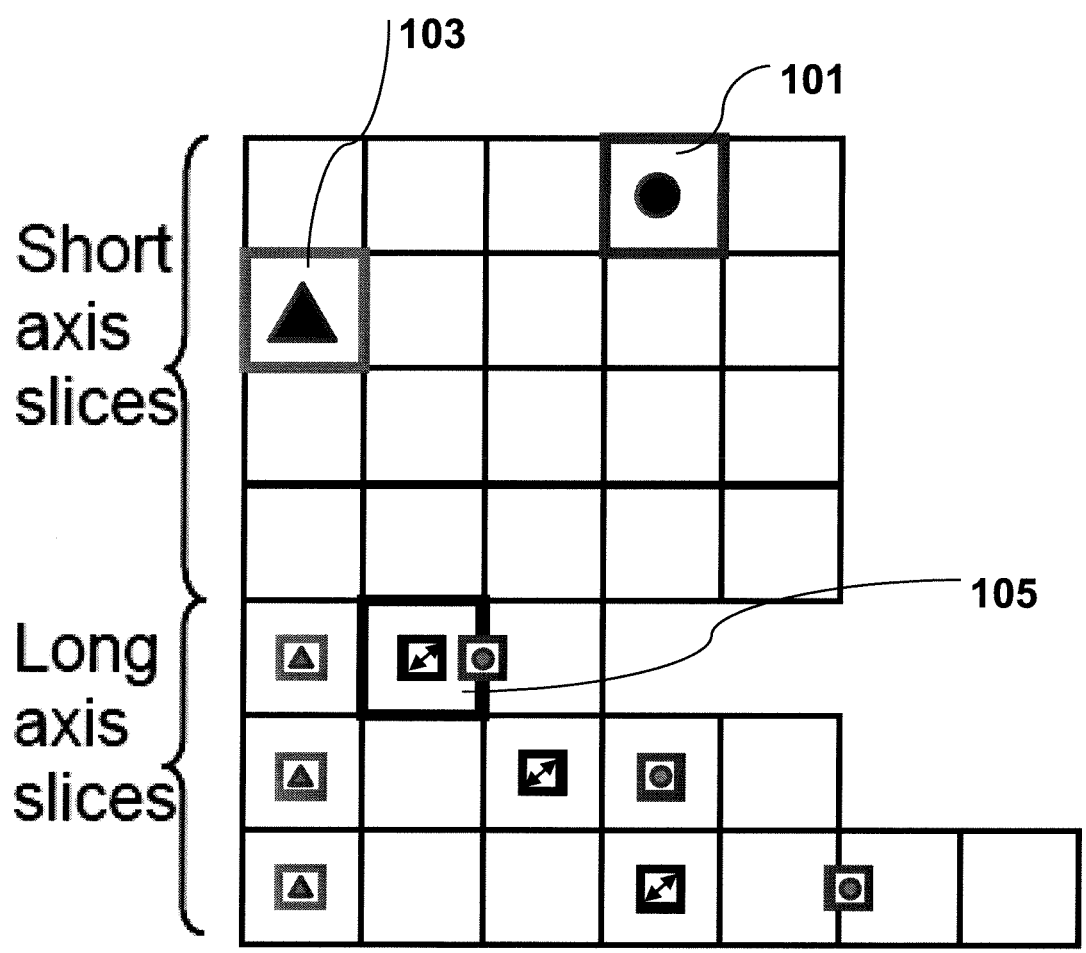
FIG. 1 illustrates short and long axis slices.

One solution that some people have adopted is to contour the left ventricle one slice lower at end-systole than at end-diastole. Supposedly, this accounts for the shortening of the left ventricle during the cardiac cycle. More and more, however, long axis acquisitions are also available along with the short axis images. The mitral valve insertion points are very visible on these long axis images and can be tracked over time.

In accordance with an aspect of the present invention, the following method to calculate the volume of the left ventricle by combining the contours on short axis images and the position of the mitral valve is provided.

1. Base plane detection on long axis images, including:
   A. Mitral valve points landmark detection
   B. Landmark tracking to all phases
   C. Base plane fitting
2. Base plane intersection with the short axis stack
3. Volume computation Each of the steps will be described in more details in the following.

1. Base Plane Detection on Long Axis Images

This step as an aspect of the present invention is also described in the US. Provisional Patent Application Ser. No. 61/388,140 filed on Sep. 30, 2010 entitled "Estimating a moving structure by tracking automatically detected landmarks in image sequences" which is incorporated herein by reference. Aspects of this invention are also described herein next and provided as an aspect of the present invention.

Estimating a Moving Structure by Tracking Automatically Detected Landmarks in Image Sequences The automatic detection of landmarks in image sequences is an important image analysis tasks. For example, in medical images important information, such as the extent of the Left Ventricle (LV), can be derived from the location of mitral valve insertion points. Depending on the clinical application, the automatic detection of landmarks as described in "[1] X. Lu, B. Georgescu, M.-P. Jolly, J. Guehring, A. Young, B. Cowan, A. Littmann, D. Comaniciu, "Cardiac anchoring in MRI through context modeling", MICCAI, 2010", is significantly robust for medical needs. In case the landmarks are part of an image sequence, they could be automatically detected in each image. However, in this case no knowledge about the geometrical relationship along the image sequence is considered and could lead to non-consistent motion of such landmarks. Furthermore, the introduction of outliers in the landmark detection could disturb the analysis of the entire image sequence.

Methods as disclosed in "[2] Z. Tu, "Probabilistic boosting-tree: Learning discriminative models for classification, recognition, and clustering" ICCV 1589-1596 (2005)", and "[3] Zheng, Y., Barbu, A., Georgescu, B., Scheuering, M., Comaniciu, D.: Fast automatic heart chamber segmentation from 3D CT data using marginal space learning and steerable features. In: Proc. ICCV. (2007)" are used as part of the landmark detection method and are incorporated herein by reference.

The following aspect of the present invention aims at circumventing these issues in image sequences by geometrically propagating the detected landmarks and fitting them to a higher dimensional structure as part of the image sequence. By doing so, the geometric consistency will be provided by the propagation function and outliers are treated or prevented by the fitting step/module. An example application of this aspect of the present invention is the modeling of the mitral valve by a simple plane in order to determine the extent of the left ventricle in the analysis of cardiac MR time series data.

One idea of this aspect of the present invention can be best described as follows: Combining three singular automatic modules: the landmark detection module, the propagation module, and the structure fitting module, in order to increase robustness and consistency of detecting a moving structure in image sequences.

The fitting or estimation module is significant since it fits a specific structure, e.g. a plane as described below, across the entire image sequence and provides thus another level of robustness to the system. The individual modules are described in the following.

A. Mitral Valve Points Landmark Detection

The goal of the landmark detection module is to automatically detect the valve insertion points on a long axis cardiac cine image of the left ventricle. This can be for the mitral valve, the aortic valve, or the tricuspid valve. Currently, the method has been trained and evaluated on the mitral valve only. The details of the algorithm are detailed in "[1] X. Lu, B. Georgescu, M.-P. Jolly, J. Guehring, A. Young, B. Cowan, A. Littmann, D. Comaniciu, "Cardiac anchoring in MRI through context modeling", MICCAI, 2010", the essence of which is described briefly here.

The anchoring component for the anatomy of interest, in this case, the valve points, is represented as a bounding box with 5 parameters (2 translations, 1 orientation, and 2 scales). A probabilistic boosting tree as described in "[2] Z. Tu, "Probabilistic boosting-tree: Learning discriminative models for classification, recognition, and clustering" ICCV 1589-1596 (2005)" is used to classify the image into object or background. Marginal space learning as described in "[3] Zheng, Y., Barbu, A., Georgescu, B., Scheuering, M., Comaniciu, D.: Fast automatic heart chamber segmentation from 3D CT data using marginal space learning and steerable features. In: Proc. ICCV. (2007)" is used to reduce the computational cost of searching through the large 5-dimensional parameter space.

Segmentation of a cardiac chamber or a wall of a chamber in an image or a slice of a cardiac image is known to one of ordinary skill. This segmentation in a slice forms a first and visible contour of a cardiac chamber. To determine the actual contour of the volume of the chamber a base plane determined by the mitral valve has to be established. This requires the detection of the valve points, which can be achieved in the long axis images.

In order to improve the detection of the valve points, they are detected in conjunction with the apex point. Both anchoring components are detected independently in a first stage and multiple hypotheses are maintained at each stages of the marginal space learning algorithm. Only hypotheses that also satisfy the joint contextual model for apex and valve points are retained.

B. Landmark Tracking to all Phases

In order to improve the consistency of the detected valve points, they are propagated by an inverse-consistent image registration algorithm. The algorithm is disclosed and described in detail in "[4] C. Guetter, H. Xue, C. Chefd'Hotel, J. Guehring, "Efficient Symmetric and Inverse-Consistent Deformable Registration Through Interleaved Optimization, ISBI, 2011" and has proven to work well in image sequences of cardiac cycles. Note that the geometric propagation can be done by any function $f_p$ that delivers a meaningful mapping throughout the image sequence.

C. Base Plane Fitting

Landmark detection is performed on only one image at a time. When multiple long axis images are available, it is important to make sure that valve points are consistent. This is enforced by measuring the distance in 3D between the centers of the detected valve points on the different long axis planes. As long as this distance is not too large (less than a short axis slice spacing), the valve points are retained. The goal is to prevent gross errors like the detection of the papillary muscles accidentally in one plane. When multiple long axis slices are available, the 3D plane is fitted through the N mitral valve landmarks $(x_i, y_i, z_i)$ using least squares as follows.

The matrix A is defined as:

$$A = \begin{bmatrix} \sum_{i=0}^{N}(x_i-x_c)^2 & \sum_{i=0}^{N}(x_i-x_c)\times(y_i-y_c) & \sum_{i=0}^{N}(x_i-x_c)\times(z_i-z_c) \\ \sum_{i=0}^{N}(x_i-x_c)\times(y_i-y_c) & \sum_{i=0}^{N}(y_i-y_c)^2 & \sum_{i=0}^{N}(y_i-y_c)\times(z_i-z_c) \\ \sum_{i=0}^{N}(x_i-x_c)\times(z_i-z_c) & \sum_{i=0}^{N}(y_i-y_c)\times(z_i-z_c) & \sum_{i=0}^{N}(z_i-z_c)^2 \end{bmatrix}$$

where $(x_c, y_c, z_c)$ is the center of all the landmarks Note that the covariance matrix would be A divided by the number of points N. Then, the 3D plane is defined by the point $P=(x_c, y_c, z_c)$ and the normal is defined from the single value decomposition of $A=UWV^{-1}$.

Define $\hat{k}=\arg\min_k (W(k))$, the index k for which W(k) is minimum. Then, the normal is the $\hat{k}^{th}$ column of the matrix U, namely $\vec{n}=U(0,\hat{k}),U(1,\hat{k}),U(2,\hat{k}))$.

When only one long axis slice is available, the normal of the 3D plane is determined by combining the two landmarks with the short axis direction $\vec{D}$:

$$\vec{n}=\vec{L}\times(\vec{L}\times\vec{D}) \text{ where } \vec{L}=(x_2-x_2,y_2-y_1,z_2-z_1).$$

Note that also the plane fitting could be substituted by a line fitting or mesh fitting depending on the underlying structure that needs to be estimated.

Thus, in accordance with an aspect of the present invention, landmarks are detected in individual images using a landmark detector based on probabilistic boosting trees and marginal space learning. Landmarks are detected on multiple long axis slices at the same phase of the cardiac cycle and they are retained only if they are consistent, namely their centers are not too far from each other in 3D. Once a consistent set of landmarks has been obtained, the next two steps can be executed, not in any particular order. The individual landmarks are propagated over time to all the other images in the same slice using a set of deformation fields that was recovered between images using deformable registration. Landmarks from multiple slices at the same time frame can be used to fit a plane and recover the mitral valve base plane in 3D.

2. Base Plane Intersection with the Short Axis Stack

Planes are now available in 3D at each phase of the cardiac cycle. It is noted, that not all slices where acquired with the same number of phases. All short axis slices are required to have the same number of phases, but the long axis slices are not. Therefore, in order to determine the position of the 3D plane for a particular short axis phase, the landmarks from the long axis images are interpolated in the following manner. Every image in the dataset is identified by its slice and phase position (s, p).

The phase position is converted to a normalized phase number $p/N_s$, where $N_s$ is the number of phases in slice s. The landmarks to be used to compute the plane are interpolated at the same normalized phase number on all long axis slices. This is illustrated in FIG. 1. In FIG. 1 short axis slices landmarks 101 and 103 are identified and marked in diagram as a circle and a triangle respectively and are shown as interpolated in the long axis slices in diagram. The double arrow identifies a landmark 105 in a long axis slice.

Once a 3D plane has been generated for a given phase in the short axis stack, it can be used along with the contours in that stack to compute the volume.

3. Volume Computation

Figure 2:
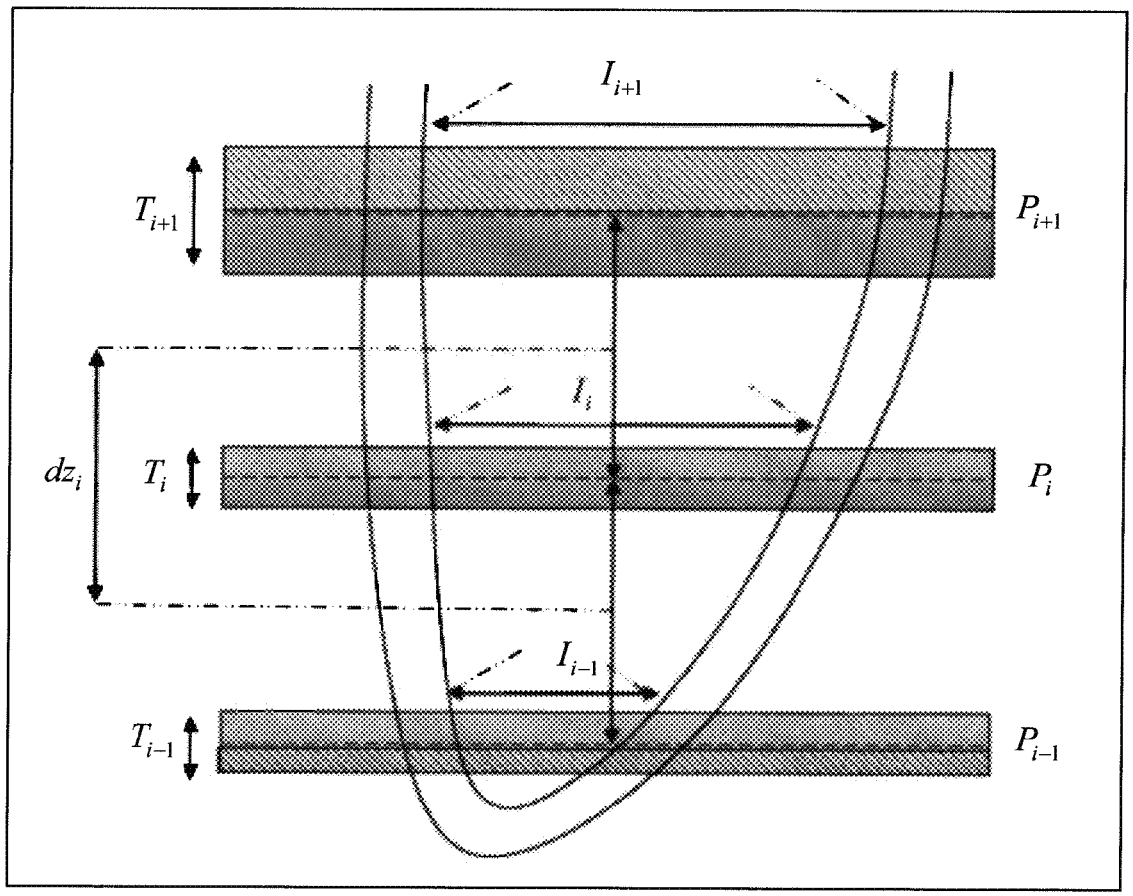
FIG. 2 illustrates how to determine a cardiac volume in accordance with an aspect of the present invention.

The volume computation when the base plane is not taken into account is based on the diagram of FIG. 2 and the following formula.

$$V_{act} = I_{base}\left(\frac{T_{base}}{2} + \frac{|P_{base+1} - P_{base}|}{2}\right) +$$
$$I_{apex}\left(\frac{T_{apex}}{2} + \frac{|P_{apex} - P_{apex-1}|}{2}\right) + \sum_{i=base+1}^{i=apex-1} I_i\left(\frac{|P_{i+1} - P_i|}{2} + \frac{|P_i - P_{i-1}|}{2}\right)$$

or $$V = I_{base} \times dz_{base} + I_{apex} \times dz_{apex} + \sum_{i=base+1}^{apex-1} I_i \times dz_i.$$

The parameter dz is a thickness of an image slice.

Figure 3:
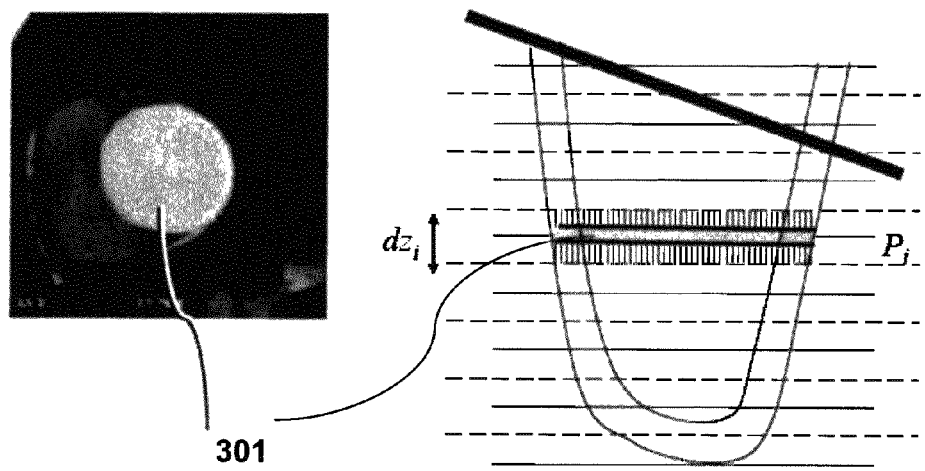
FIGS. 3-6 illustrate steps in determining a cardiac volume from mage data in accordance with an aspect of the present invention.
Figure 4:
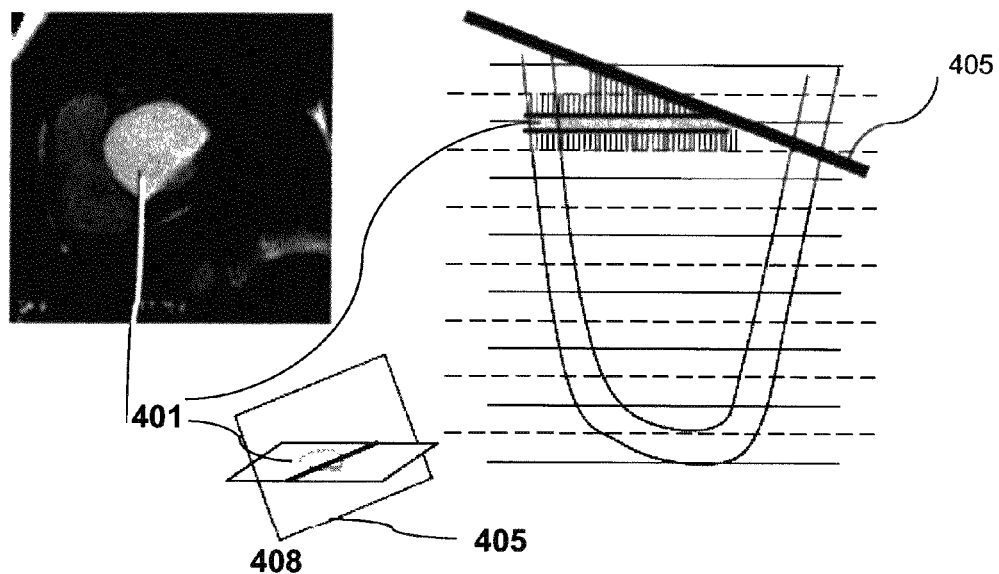
Figure 5:
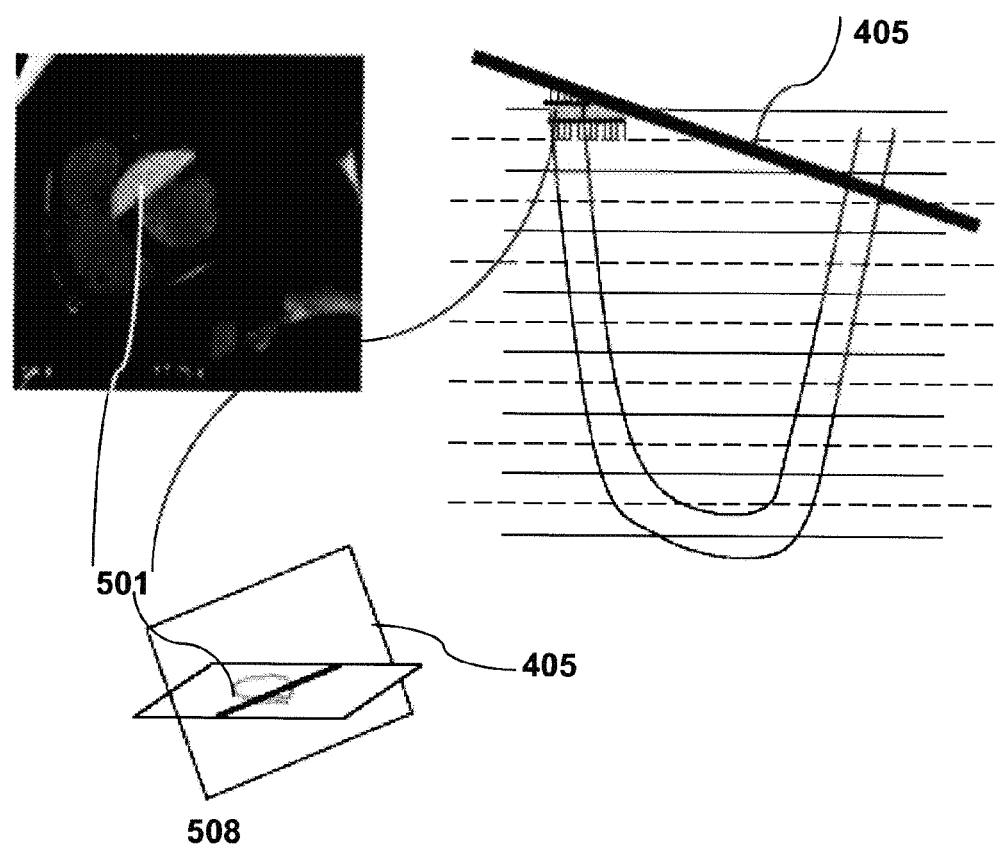

When the base plane is available, the individual volume contributions change for the slices that intersect with the base plane, but remain the same for the others. The idea is illustrated in FIGS. 3-6 in diagram. The images on the left in FIGS. 3, 4 and 5 illustrate the slices 301, 401 and 501 which are also shown in diagram on the right side.

One may thus express the total volume of the chamber as:

$$V_{act} = V - UP_{bp} \text{ with:}$$

$$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) +$$
$$\sum_{i=base+1}^{i=apex-1} I_i\left(\frac{|P_{i+1} - P_i|}{2} + \frac{|P_i - P_{i-1}|}{2}\right) - UP_{bp}.$$

Herein V is the volume of the chamber unrestricted by the base plane and $UP_{bp}$ is the volume of the restricted chamber above the base plane. In one embodiment of the present invention $UP_{bp}$ is determined by the summation of the parts of the slices of the contours that are restricted by the base plane. This means in effect that one can determine the total volume by summing the volumes of the slices that are unrestricted by the base plane and the volumes of the slices that are restricted by the intersection with the base plane. The total volume of the chamber restricted by the base plan is then determined by the above expression. It is to be understood that $UP_{bp}$ is determined by a summation of the parts of the slices that are "cut-off" from the contour in each slice by the base plane. This is further illustrated in FIG. 6.

The expression can be written as $V_{act} = V_{seg} - UP_{bp}$, wherein $V_{seg}$ is a volume of a segmented image of the chamber, $UP_{bp}$ is the part of the segmented chamber that is cut-off by the base plane, and $V_{act}$ is the actual or calculated volume of the cardiac chamber.

1. When a short axis slice does not intersect with the base plane, or at least the segmentation contour of the cardiac chamber in the short axis image does intersect with the base plane, the contour is the segmentation contour and its volume is calculated by computing the area of the contour polygons and multiplying by the slice spacing as described above and as illustrated in FIG. 3.

2. When the base plane intersects the 3D bounding of the segmentation contour on its slice and the slice above, the volume is computed by discretizing the base plane intersection limited segmented contours and multiplying some pixels by the slice spacing and other by the distance to the base plane as illustrated in FIG. 4. The relevant slice contour is 401, which is determined by the segmentation contour limited by intersection with base plane 405 is identified in the image as well as the diagram. The base plane 405 is identified in the diagram. A 3D diagram 408 shows the slice contour 401 and its intersection with the base plane 405.

3. For the most basal slice, the volume is extended upwards to the base plane as illustrated in FIG. 5. The relevant slice contour is 501 which is the segmentation contour in the slice limited by the base plane identified in the image as well as in the diagram. The base plane 405 is identified in the diagram. A 3D diagram 508 shows the slice contour 501 and its intersection with the base plane 405.

Figure 6:
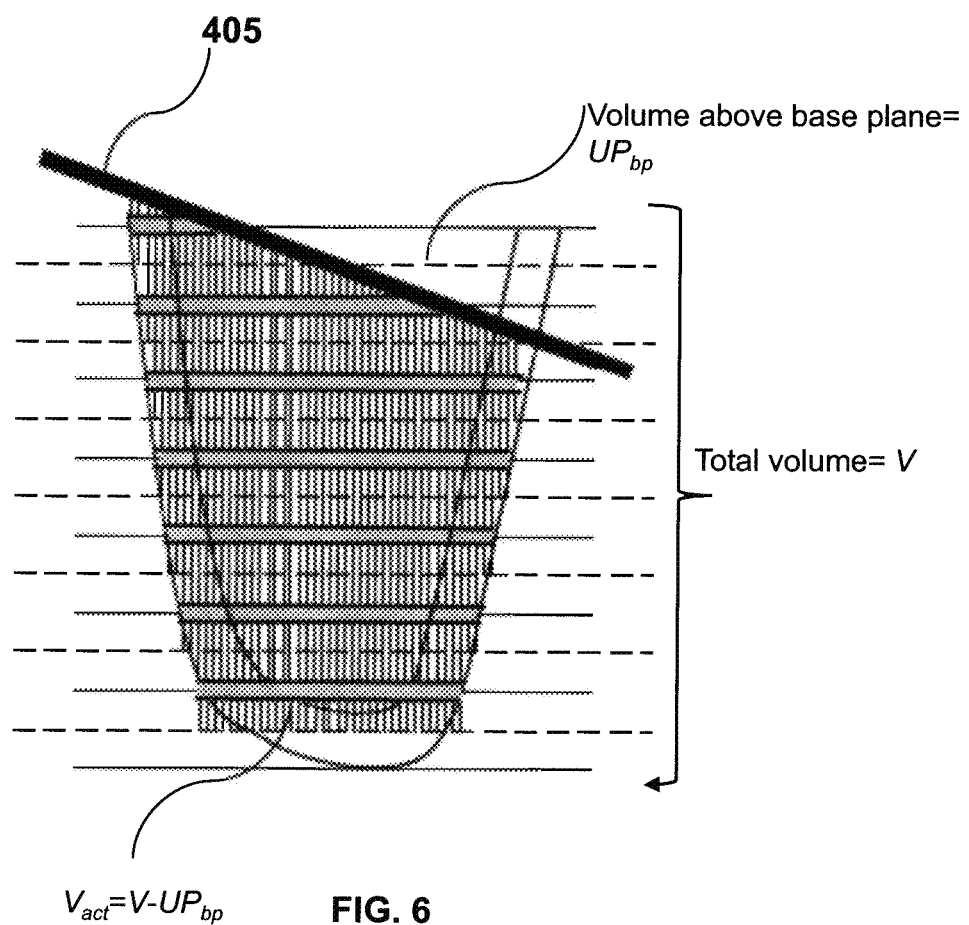

4. The sum of all partial contributions is performed as illustrated in FIG. 6.

Figure 7:
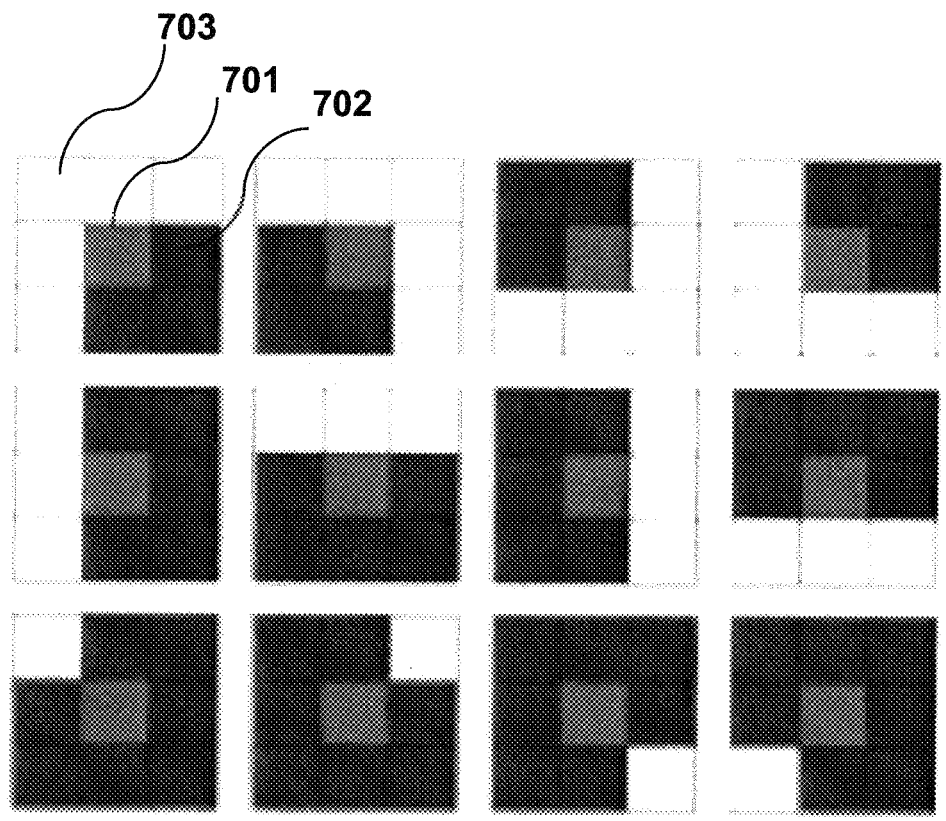
FIG. 7 illustrates discretizing an area in accordance with an aspect of the present invention.

In one embodiment of the present invention the discretized area is computed by applying a factor (from 0 to 1) to every pixel inside the contour, depending on its 8-neighborhood. An efficient implementation is provided using a 3×3 mask which is illustrated in FIG. 7. With 0, 1, 2 or 3 pixels inside the contour provides a value 0; 4 pixels provides 0.125; 5 pixels provides 0.25; 6 pixels provides 0.5; 7 pixels provides 0.75; 8 pixels provides 0.875 and all 9 pixels provides a factor 1. In FIG. 7, which shows how a series of pixels is processed, the center pixel 701 is lighter indicating it is a considered pixel in the illustrated matrix. The darker pixels, for example pixel 702 is inside a contour and counted in accordance with the scheme above. The light pixels 703 are considered outside the contour and not counted.

Results

Images have been generated that determine contours and base planes on an entire cine dataset by applying methods as disclosed herein. In these processed images endocardium contours and epicardium contours can be clearly identified in the images. One can also show where base planes intersect with the image planes. It can be demonstrated that the location of the mitral valve base plane on short axis images cannot easily be identified with any landmark. In accordance with an aspect of the present invention, the same technique as described herein is applied to the right ventricle using the tricuspid valve base plane and the contours for the right ventricle endocardium.

A System for Cardiac Chamber Volume Computation from Contours and Base Plane in Cardiac MR Cine Images The methods as provided herein are, in one embodiment of the present invention, implemented on a system or a computer device. A system 1800 illustrated in FIG. 8 and as provided herein is enabled for receiving, processing and generating data. The system is provided with data that can be stored on a memory 1801. Data which may be medical image data may be obtained from a medical imaging device such as an MRI machine 1811 or data may be provided from a data source. Data may be provided on an input 1806. Such data may be image data, or any other data that is helpful in a context of the present invention. The processor is also provided or programmed with an instruction set or program to execute the methods of the present invention that is stored on a memory 1802 and is provided to the processor 1803, which executes the instructions of 1802 to process the data from 1801 or other input data. Data, such as image data or any other data, such as data that determines a cardiac volume, provided by the processor can be outputted on an output device 1804, which may be a display to display data or images or a data storage device. The output device 1804 in one embodiment is a screen or display where upon the processor displays images such as video images which illustrate contours in a medical image. The processor also has a communication channel 1807 to receive external data from a communication device and to transmit data to an external device. The system in one embodiment of the present invention has an input device 1805, which is an input device such as a keyboard which for instance allows a user to configure the system. An input device which may also be or include a keyboard, a mouse, a pointing device, or the like or any other device that can generate signals representing data to be provided to processor 1803.

Figure 8:
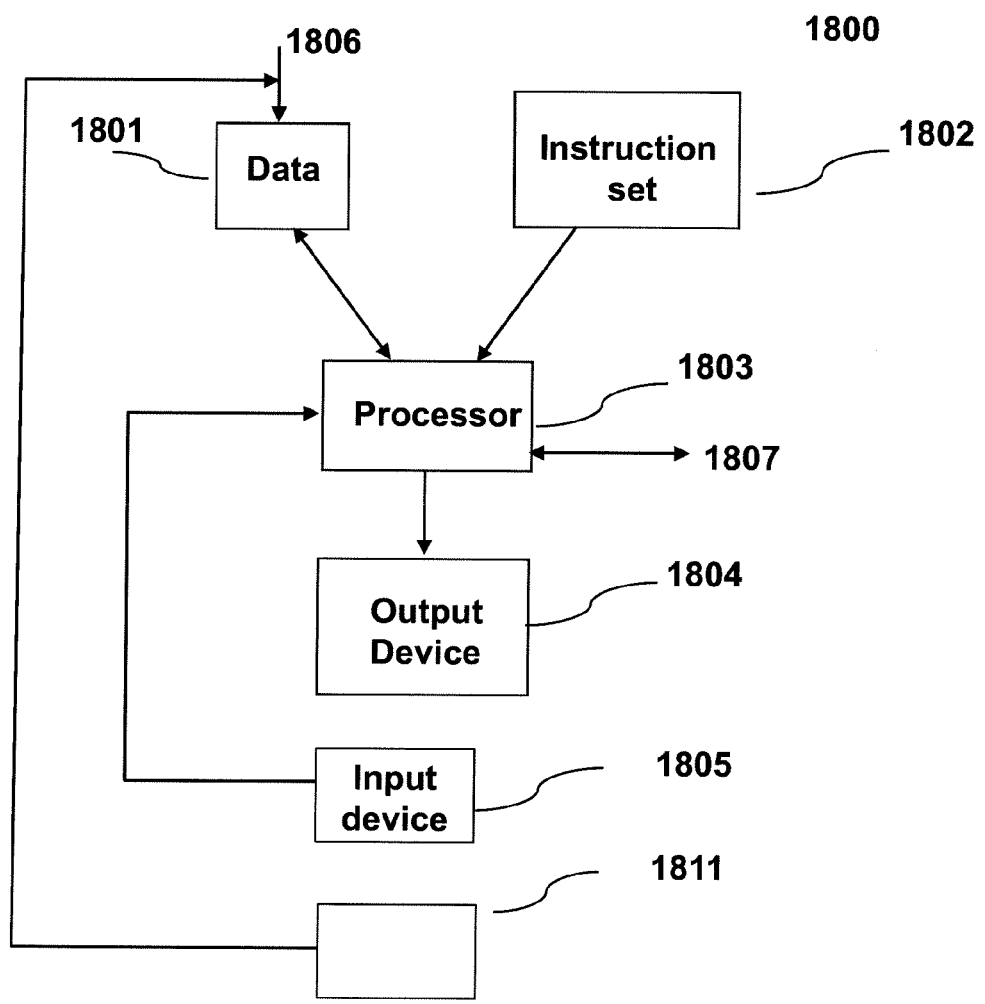
FIGS. 8 and 9 each illustrate a system in accordance with an aspect of the present invention.
Figure 9:
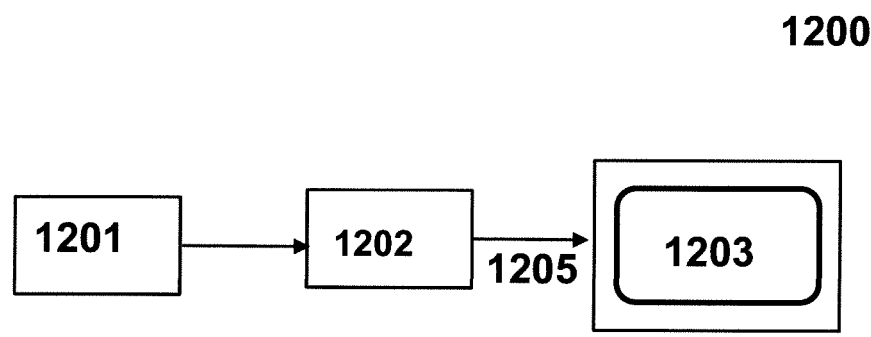

The processor can be dedicated hardware. However, the processor can also be a CPU or any other computing device that can execute the instructions of 1802. Accordingly, the system as illustrated in FIG. 8 provides a system for data processing resulting from a medical imaging machine or any other data source and is enabled to execute the steps of the methods as provided herein as an aspect of the present invention.

FIG. 10 shows a diagram of a system 1200 which has a data source 1201 which may be an MRI machine or a data source that holds MRI data and which is connected to a computer system 1202. The computer system 1202 which includes a processor is programmed to receive image data from the source 1201 and to process the images in accordance with one or more aspects of the present invention. The processed image data is provided via an output 1205 to a target 1203 which may be a display which shows contours in MRI images or displays related data such as a cardiac volume.

The system 1200 in one embodiment of the present invention is used by a medical organization. The system 1200 in one embodiment of the present invention is located in a medical facility such as a hospital, a clinic, an emergency clinic or a medical practice operated by medical practitioners.

The following references provide background information generally related to the present invention and are hereby incorporated by reference: [1] X. Lu, B. Georgescu, M.-P. Jolly, J. Guehring, A. Young, B. Cowan, A. Littmann, D. Comaniciu, "Cardiac anchoring in MRI through context modeling", MICCAI, 2010; [2] Z. Tu, "Probabilistic boosting-tree: Learning discriminative models for classification, recognition, and clustering" ICCV 1589-1596 (2005); [3] Zheng, Y., Barbu, A., Georgescu, B., Scheuering, M., Comaniciu, D.: Fast automatic heart chamber segmentation from 3D CT data using marginal space learning and steerable features. In: Proc. ICCV. (2007); and [4] C. Guetter, H. Xue, C. Chefd'Hotel, J. Guehring, "Efficient Symmetric and Inverse-Consistent Deformable Registration Through Interleaved Optimization, ISBI, 2011."

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims.

The invention claimed is:

1. A method for calculating a volume of a cardiac chamber from a plurality of slices of image data, comprising:
a processor receiving a plurality of short axis images and a plurality of long axis images of the cardiac chamber;
the processor determining a base plane from a landmark in a long axis image of the cardiac chamber;
the processor determining an intersection between the base plane and the short axis images;
the processor determining a contour in a first slice of the cardiac chamber in a short axis image determined by a segmentation of the chamber and the intersection;
the processor calculating a volume related to the contour in the first slice, which is a first partial contribution to the volume of the cardiac chamber; and
the processor calculating a volume related to a contour in a second slice of the cardiac chamber in a short axis image determined by a segmentation of the cardiac chamber which does not intersect with the base plane.

2. The method of claim 1, wherein an area of the first contour is discretized by applying a factor to each pixel inside the first contour depending on its neighboring pixels.

3. The method of claim 1, wherein the volume related to the contour in the second slice is a second partial contribution to the volume.

4. The method of claim 3, wherein the volume is calculated by summing all partial contributing volumes related to contours in slices located between a base and an apex of the chamber.

5. The method of claim 1, wherein the cardiac chamber is a left ventricle.

6. The method of claim 1, wherein the landmark is a mitral valve anchor point.

7. The method of claim 1, wherein the volume is determined by an expression $$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) + \sum_{i=base+1}^{i=apex-1} \bar{I}_i\left(\frac{|P_{i+1} - P_i|}{2} + \frac{|P_i - P_{i-1}|}{2}\right) - UP_{bp},$$

wherein:
$V_{act}$ is the volume of the cardiac chamber;
I is an area of a contour in a slice;
P is a 3D position of a slice;
T is a thickness of a slice;
base is an index for a basal slice of the cardiac chamber;
apex is an index of an apical slice of the cardiac chamber; and
$UP_{bp}$ is a cut-off volume that is cut-off from a segmentation of the cardiac chamber by the base plane.

8. The method of claim 1, wherein the volume is applied to evaluate an ejection fraction.

9. A system to calculate a volume of a cardiac chamber from a plurality of slices of image data, comprising:
a memory enabled to store instructions and data;
a processor enabled to execute instructions to perform the steps:
receiving a plurality of short axis images and a plurality of long axis images of the cardiac chamber;
determining a base plane from a landmark in a long axis image of the cardiac chamber;
determining an intersection between the base plane and the short axis images;
determining a contour in a first slice of the cardiac chamber in a short axis image determined by a segmentation of the cardiac chamber and the intersection;

calculating a volume related to the contour in the first slice, wherein the volume related to the contour in the first slice is a first partial contribution to the volume of the cardiac chamber; and calculating a volume related to a contour in a second slice of the cardiac chamber in a short axis image determined by a segmentation of the cardiac chamber which does not intersect with the base plane.

10. The system of claim 9, wherein an area of the first contour is discretized by applying a factor to each pixel inside the first contour depending on its neighboring pixels.

11. The system of claim 9, wherein the volume related to the contour in the second slice is a second partial contribution to the volume.

12. The system of claim 11, wherein the volume is calculated by summing all partial contributing volumes related to contours in slices located between a base and an apex of the cardiac chamber.

13. The system of claim 9, wherein the cardiac chamber is a left ventricle.

14. The system of claim 9, wherein the landmark is a mitral valve anchor point.

15. The system of claim 9, wherein the volume is determined by an expression $$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) + \sum_{i=base+1}^{i=apex-1} \bar{I}_i\left(\frac{|P_{i+1} - P_i|}{2} + \frac{|P_i - P_{i-1}|}{2}\right) - UP_{bp},$$

wherein:
$V_{act}$ is the volume of the cardiac chamber;
I is an area of a contour in a slice;
P is a 3D position of a slice;
T is a thickness of a slice;
base is an index for a basal slice of the cardiac chamber;
apex is an index of an apical slice of the cardiac chamber; and $UP_{bp}$ is a cut-off volume that is cut-off from a segmentation of the cardiac chamber by the base plane.

16. The system of claim 9, wherein the volume is applied to evaluate an ejection fraction.

17. A system to calculate a volume of a cardiac chamber from a plurality of slices of image data, comprising:
a memory enabled to store instructions and data;
a processor enabled to execute instructions to perform the steps:
receiving a plurality of short axis images and a plurality of long axis images of the cardiac chamber;
determining a base plane from a landmark in a long axis image of the cardiac chamber;
determining an intersection between the base plane and the short axis images;
determining a contour in a first slice of the cardiac chamber in a short axis image determined by a segmentation of the cardiac chamber and the intersection; and
calculating a volume related to the contour in the first slice;
wherein the volume is determined by an expression $$V_{act} = I_{base}\left(\frac{T_{base}}{2} + \frac{|P_{base+1} - P_{base}|}{2}\right) + I_{apex}\left(\frac{T_{apex}}{2} + \frac{|P_{apex} - P_{apex-1}|}{2}\right) + \sum_{i=base+1}^{i=apex-1} \bar{I}_i\left(\frac{|P_{i+1} - P_i|}{2} + \frac{|P_i - P_{i-1}|}{2}\right) - UP_{bp},$$

wherein:
$V_{act}$ is the volume of the cardiac chamber;
I is an area of a contour in a slice;
P is a 3D position of a slice;
T is a thickness of a slice;
base is an index for a basal slice of the cardiac chamber;
apex is an index of an apical slice of the cardiac chamber; and
$UP_{bp}$ is a cut-off volume that is cut-off from a segmentation of the cardiac chamber by the base plane.

* * * * *